(12) United States Patent
Matsuo et al.

(10) Patent No.: US 7,690,827 B2
(45) Date of Patent: Apr. 6, 2010

(54) LIGHT GUIDE MEMBER, ILLUMINATION APPARATUS, AND IMAGE CAPTURING APPARATUS USING THE SAME

(75) Inventors: Koichi Matsuo, Inagi (JP); Chikara Nishio, Kawasaki (JP)

(73) Assignees: Fujitsu Limited, Kawasaki (JP); Fujitsu Frontech Limited, Inagi-shi (JP)

( * ) Notice: Subject to any disclaimer, the term of this patent is extended or adjusted under 35 U.S.C. 154(b) by 28 days.

(21) Appl. No.: 11/592,223

(22) Filed: Nov. 3, 2006

(65) Prior Publication Data

US 2007/0206391 A1 Sep. 6, 2007

(30) Foreign Application Priority Data

Mar. 3, 2006 (JP) .............................. 2006-058087

(51) Int. Cl.
*G02B 6/00* (2006.01)

(52) U.S. Cl. .................... 362/558; 362/27; 362/602; 362/628

(58) Field of Classification Search .................. 362/26, 362/27, 240, 244, 246, 276, 327, 329, 335, 362/558, 575, 602, 628; 359/387; 358/484
See application file for complete search history.

(56) References Cited

U.S. PATENT DOCUMENTS

| | | | | |
|---|---|---|---|---|
| 2,908,197 | A * | 10/1959 | Wells et al. | ................... 362/327 |
| 5,963,333 | A | 10/1999 | Walowit et al. | |
| 6,020,583 | A | 2/2000 | Walowit et al. | |
| 6,147,761 | A | 11/2000 | Walowit et al. | |
| 6,334,688 | B1 | 1/2002 | Niwa | |
| 6,404,904 | B1 | 6/2002 | Einighammer et al. | |
| 6,561,690 | B2 * | 5/2003 | Balestriero et al. | ........... 362/558 |
| 7,168,839 | B2 * | 1/2007 | Chinniah et al. | ............. 362/327 |
| 2003/0117789 | A1 * | 6/2003 | Nowak | ......................... 362/27 |
| 2004/0022421 | A1 | 2/2004 | Endoh et al. | |
| 2006/0110145 | A1 | 5/2006 | Fujimoto et al. | |

FOREIGN PATENT DOCUMENTS

| | | |
|---|---|---|
| CN | 1635536 A | 7/2005 |
| EP | 0 406 845 A2 | 1/1991 |
| EP | 1 389 788 A | 2/2004 |

(Continued)

OTHER PUBLICATIONS

European Search Report dated Jul. 4, 2007, issued in corresponding European Patent Application No. 06255612.1.

*Primary Examiner*—Y My Quach Lee
(74) *Attorney, Agent, or Firm*—Westerman, Hattori, Daniels & Adrian, LLP

(57) ABSTRACT

A light guide member illuminates with uniform light intensity distribution using the point light source light. On the lower end of the light guide member having a pair of side faces disposed oppositely, a groove is provided for receiving light output from each point light source and diffusing the above received light to at least three directions from the incident side toward the output side. Light components having directions using side-face reflection are generated in the light guide member, enabling light output to multiple directions from the cylindrical-shaped light guide member, and uniform illumination over a wide range. By using the ring-shaped light guide member, cost reduction is effectively achieved, and miniaturization of the illumination mechanism and the image capturing mechanism can also be attained.

14 Claims, 17 Drawing Sheets

FOREIGN PATENT DOCUMENTS

| | | |
|---|---|---|
| JP | 10-21703 A | 1/1998 |
| JP | 2000-113760 A | 4/2000 |
| JP | 2000-207916 A | 7/2000 |
| JP | 2000-512021 A | 9/2000 |
| JP | 2002-513188 A | 5/2002 |
| JP | 2004-62826 A | 2/2004 |
| WO | WO 2004/032250 A1 | 4/2004 |
| WO | WO 2004-088588 A1 | 10/2004 |
| WO | WO 2005/041556 A2 | 5/2005 |

* cited by examiner

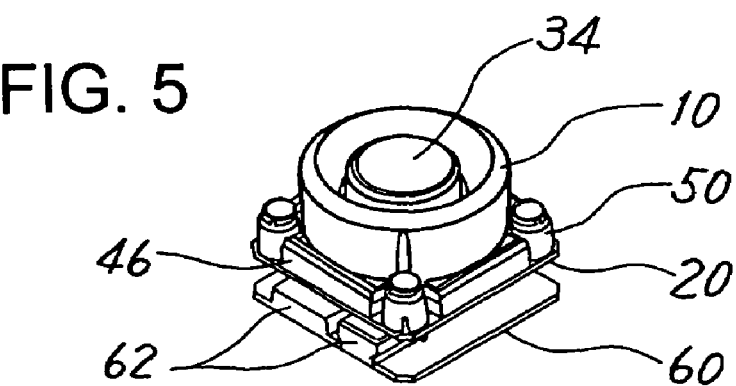
FIG. 5
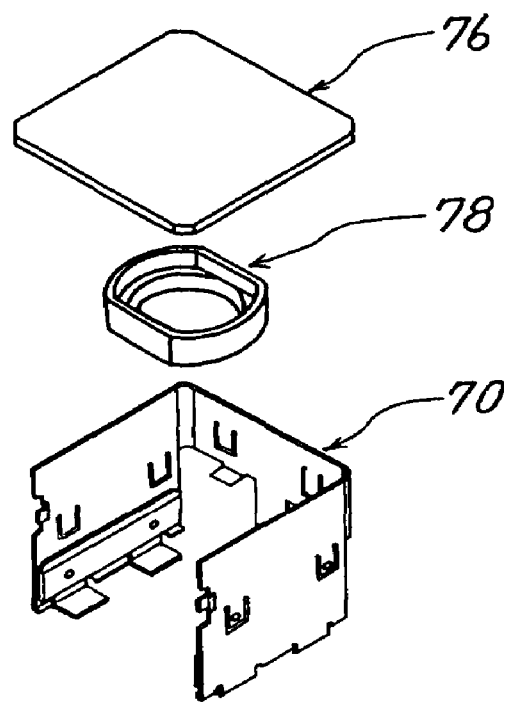
FIG. 6
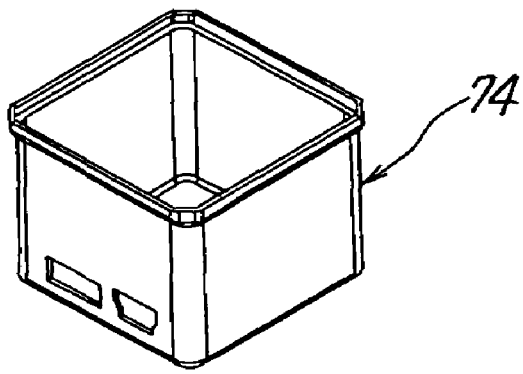

PRIOR ART

FIG. 21
PRIOR ART
REGISTERED IMAGE 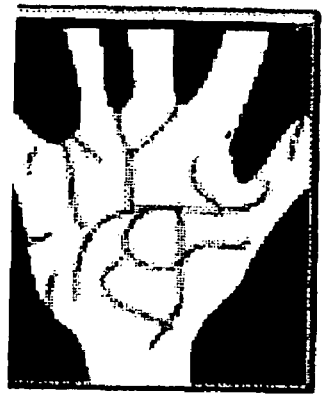 VERIFICATION IMAGE 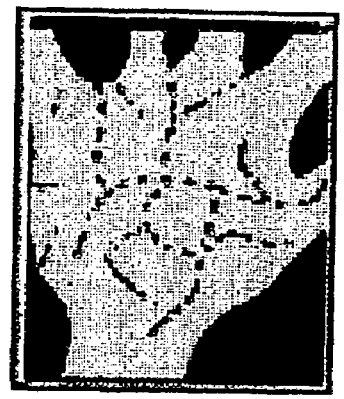
FIG. 22
PRIOR ART
REGISTERED IMAGE 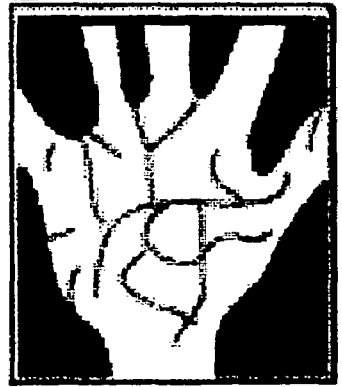 VERIFICATION IMAGE 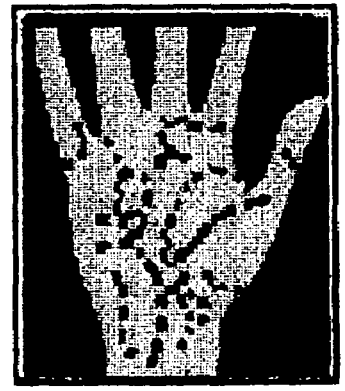

LIGHT GUIDE MEMBER, ILLUMINATION APPARATUS, AND IMAGE CAPTURING APPARATUS USING THE SAME

CROSS-REFERENCE TO RELATED APPLICATIONS

This application is based upon and claims the benefit of priority from the prior Japanese Patent Application No. 2006-058087, filed on Mar. 3, 2006, the entire contents of which are incorporated herein by reference.

BACKGROUND OF THE INVENTION

1. Field of the Invention

The present invention relates to a light guide member and an illumination apparatus for guiding light emitted from a plurality of light-emitting devices to an object, and irradiating the object, and an image capturing apparatus for capturing an image of the object using the same, and more particularly a light guide member and an illumination apparatus for uniformly irradiating a predetermined range of the object with light emitted from a plurality of light-emitting devices functioning as point light sources, and an image capturing apparatus using the same.

2. Description of the Related Art

An image capturing apparatus for capturing an image in a predetermined range of an object by irradiating the object with uniform light is widely used. In an image processing system using an image captured by such the image capturing apparatus, a sharp image is particularly required.

For example, with the development of biometric technologies in recent years, there have been provided a variety of apparatuses for personal identification, which captures an image of a portion of a human body by which an individual can be distinguished and recognizes a feature of the human body, for example, fingerprints of limbs, eye retinas, face and blood vessels.

In particular, blood vessels and skin patterns of a palm and a finger are suitable for reliable personal authentication, because a relatively large amount of personal feature data may be obtained therefrom. Further, it is believed that the patterns of blood vessels (veins) do not change from the time of an embryo throughout the lifetime of any person, and that no identical pattern exists among any persons without exception, which are therefore suitable for personal authentication. FIGS. 19 through 22 show explanation diagrams of the conventional blood vessel image authentication technique. As shown in FIG. 19, at the time of registration or authentication, a user puts a palm of a hand 110 close to an image capturing apparatus 100. The image capturing apparatus 100 emits a near infrared ray, and irradiates the palm of the hand 110. The image capturing apparatus 100 receives the near infrared ray reflected from the palm of the hand 110 by a sensor.

As shown in FIG. 20, hemoglobin in the red corpuscle flowing in a vein loses oxygen. Such the hemoglobin (deoxidized hemoglobin) absorbs the near infrared of the vicinity of 760 nm in wavelength. Accordingly, when the palm is irradiated with the near infrared, reflection is reduced in a portion in which a vein exists. Thus, by the degree of strength of the reflected near infrared, the location of veins can be recognized.

As shown in FIG. 19, first, the user registers a vein image data of the own palm into a server or a card, using the image capturing apparatus 100 shown in FIG. 19. Next, to perform personal authentication, the user makes the vein image data of the own palm to be read, using the image capturing apparatus 100 shown in FIG. 19.

The personal authentication is performed by collating the registered vein image data, which is extracted using a user ID, with a vein pattern in the collation vein image being read above. For example, in the case of the collation of the vein patterns between the registered image and the collation image as shown in FIG. 21, the person is authenticated as genuine. Meanwhile, in the case of the collation of the vein patterns between the registered image and the collation image as shown in FIG. 22, the person is not authenticated as genuine (see Japanese Unexamined Patent Publication No. 2004-062826, FIGS. 2-9).

For such the biometric authentication or the like, it is necessary to image an object (a portion of a human body in case of the biometric authentication) in a non-contact manner. For this purpose, the image capturing apparatus 100 emits light producing uniform light intensity in a certain image capturing range (distance and area), receives the reflected light of the above image capturing range by a sensor, and outputs a captured image signal as an electric signal.

FIGS. 23 and 24 show explanation diagrams of the conventional image capturing apparatus. As shown in FIGS. 23 and 24, the image capturing apparatus 100 includes an imaging unit 120 at the center, and in the periphery thereof, a plurality of light-emitting devices 130-1 to 130-8. The dotted lines shown in FIG. 23 represent the range of the light having uniform intensity emitted from an individual light-emitting device among the plurality of light-emitting devices 130-1 to 130-8.

As such, by disposing a plurality of (here, eight) point light sources in the periphery of imaging unit 120, the imaging range of the imaging unit 120 can be irradiated with the light of uniform intensity. Meanwhile, imaging unit 120 includes a photoelectric conversion unit 122 such as a CMOS sensor, and an optical system 124 such as a lens. Since the photoelectric conversion device, which is a plane photodetector device, has a predetermined light receiving area, a predetermined optical distance is required to guide the reflected light of the image capturing range onto the light-receiving plane of the photoelectric conversion device 122. For this purpose, a lens 124 such as a fisheye lens is disposed between the photoelectric conversion unit 122 and the object, so that an image of the predetermined image capturing range is projected onto the light-receiving plane of photoelectric conversion device 122.

Thus, conventionally, in order to irradiate the object with each point light source element 130-1 to 130-8 by sharing a predetermined image capturing range, the point light source elements 130-1 to 130-8 have been disposed apart from each other, as shown in FIG. 23. Also, in order to supply the light of predetermined uniform intensity to the imaging range, the point light source elements 130-1 to 130-8 have been disposed nearer to the object than the photoelectric conversion device 122, as shown in FIG. 24 (see International Patent Publication No. WO 2004/088588, FIGS. 1 and 6).

Further, there has also been proposed a method for obtaining illumination having spread light to a certain extent by use of a ring-shaped light guide member. According to the above method, a slope notch is provided on the incident side of the ring-shaped light guide member, and light from the point light source is reflected at the slope notch to a spiral direction of the ring, so as to guide the light to the ring spiral direction, and the light is output from an upper face of the ring, and thus a certain range of ring-shaped illumination is produced (see Japanese Unexamined Patent Publication No. 2000-207916, FIGS. 4, 6, 7 and 10).

In the above conventional image capturing apparatus, as described earlier, the point light source elements 130-1 to 130-8 are disposed apart from each other, and nearer to the object than the photoelectric conversion device 122, as shown in FIG. 24. Therefore, it is difficult to miniaturize the image capturing apparatus. Also, there is a restriction when incorporating the image capturing apparatus into equipment.

Further, as also shown in FIG. 24, the point light source elements 130-1 to 130-8 and the photoelectric conversion sensor 122 are disposed in different positions in the height direction of the apparatus. Therefore, a printed circuit board 132 for mounting the point light source elements 130-1 to 130-8 and another printed circuit board 126 for mounting the photoelectric conversion sensor 122 have been provided separately.

As a result, the necessity of two printed circuit boards at the minimum has impeded the cost reduction. Also, the need of two printed circuit boards also causes difficulty in miniaturizing the image capturing apparatus.

Further, because the conventional ring-shaped light guide member aims at ring-shaped illumination, the point light source is changed into a ring light source only. Therefore, it is not suitable to obtain uniform light intensity over a plane having a certain area of an image capturing range.

SUMMARY OF THE INVENTION

Accordingly, it is an object of the present invention to provide a light guide member and an illumination apparatus for performing spread illumination over an image capturing range even when using a point light source, and an image capturing apparatus for a miniaturized structure using the above light guide member and the illumination apparatus.

It is another object of the present invention to provide a light guide member and an illumination apparatus for illuminating an imaging range with substantially uniform light intensity distribution even when using a point light source, and an image capturing apparatus for a miniaturized structure using the light guide member and the illumination apparatus.

It is still another object of the present invention to provide a light guide member and an illumination apparatus for uniformly illuminating an object even when using a point light source, and an image capturing apparatus for realizing cost reduction using the light guide member and the illumination apparatus.

In order to achieve the aforementioned objects, according to the present invention, a light guide member of a cylindrical shape, which introduces light of a point light source from an incident side and outputs from an output side, includes: a lower end portion for introducing the light of the point light source; an upper end portion for outputting the light; and a light guide portion having a pair of side faces and for guiding the light of the point light source from the lower end portion to the upper end portion. And the above-mentioned lower end portion includes a groove portion for receiving the output light of the point light source and diffusing the output light of the point light source to at least three directions from the incident side toward the output side.

Further, according to the present invention, an illumination apparatus includes: a cylinder-shaped light guide member; and a plurality of point light sources disposed at intervals on a lower portion of the cylinder-shaped light guide member along the light guide member. The above-mentioned light guide member includes: a lower end portion for introducing the light of the point light source; an upper end portion for outputting the light; and a light guide portion having a pair of side faces and guiding the light of the point light source from the lower end portion to the upper end portion. Further, the lower end portion includes a groove portion for receiving the output light of the point light source and diffusing the output light of the point light source to at least three directions from the incident side toward the output side.

Still further, according to the present invention, an image capturing apparatus, which captures an image of an object by illuminating the object and receives reflected light from the object, includes: a circuit board mounted an image sensor for receiving the reflected light; a plurality of light-emitting devices mounted on the circuit board in the peripheral positions of the image sensor; a ring-shaped light guide member for guiding the light emitted from the plurality of light-emitting devices to an image capturing range, and illuminating the image capturing range; and an optical unit accommodated inside a ring of the ring-shaped light guide member, guiding the reflected light on the illuminated object located in the image capturing range to the image sensor. The above light guide member includes: a lower end portion for introducing the light of the point light source; an upper end portion for outputting the light; and a light guide portion having a pair of side faces and guiding the light of the point light source from the lower end portion to the upper end portion. Further, the lower end portion includes a groove portion for receiving the output light of the point light source and diffusing the output light of the point light source to at least three directions from the incident side toward the output side.

Further, according to the present invention, preferably, the groove portion includes a polyhedron having at least two slope faces, and one of the slope faces of the polyhedron refracts the output light of the point light source to the side face direction.

Further, according to the present invention, preferably, the groove portion includes a flat portion and at least a pair of slope faces each having an opposite inclination direction, and the pair of slope faces refracts the output light of the point light source to the one side face direction and the other side face direction.

Further, according to the present invention, preferably, the flat portion area of the groove portion is smaller than each area of the pair of slope face portions.

Further, according to the present invention, preferably, the flat portion and the pair of slope face portions respectively have areas corresponding to emission intensity distribution of the point light source.

Further, according to the present invention, preferably, the groove portion has a trapezoidal shape.

Further, according to the present invention, preferably, the upper end portion includes a slope face which becomes lower toward the outside of the cylinder-shaped light guide member.

Further, according to the present invention, preferably, the image sensor captures an image of a portion of a living body.

According to the present invention, a groove is provided on the lower end of the light guide member having a pair of side faces disposed oppositely, for receiving light output from the point light source and diffusing the light output from the point light source to at least three directions from the incident side toward the output side. Thus, by generating light components having directions resulting from reflection on the side faces, light to a multiplicity of directions can be output from the cylindrical-shaped light guide member, and thus, uniform illumination can be performed over a wide range. Because the ring-shaped light guide member can sufficiently be prepared simply by means of formation, cost reduction is effectively achieved, and miniaturization of the illumination mechanism and the imaging mechanism can also be attained.

Further scopes and features of the present invention will become more apparent by the following description of the embodiments with the accompanied drawings.

BRIEF DESCRIPTION OF THE DRAWINGS

FIG. 5 shows an assembly diagram of the decomposed components shown in FIG. 2.

FIG. 6 shows a configuration diagram of the external finishing components shown in FIG. 1.

FIG. 21 shows an explanation diagram of the conventional palm authentication technique.

FIG. 22 shows another explanation diagram of the conventional palm authentication technique.

DETAILED DESCRIPTION OF THE PREFERRED EMBODIMENTS

The preferred embodiment of the present invention is described hereinafter referring to the charts and drawings, in the order of an image capturing apparatus configuration, an illumination mechanism, an image processing configuration, and other embodiments. However, it is to be noted that the scope of the present invention is not limited to the embodiments described below.

Image Capturing Apparatus

Figure 1:
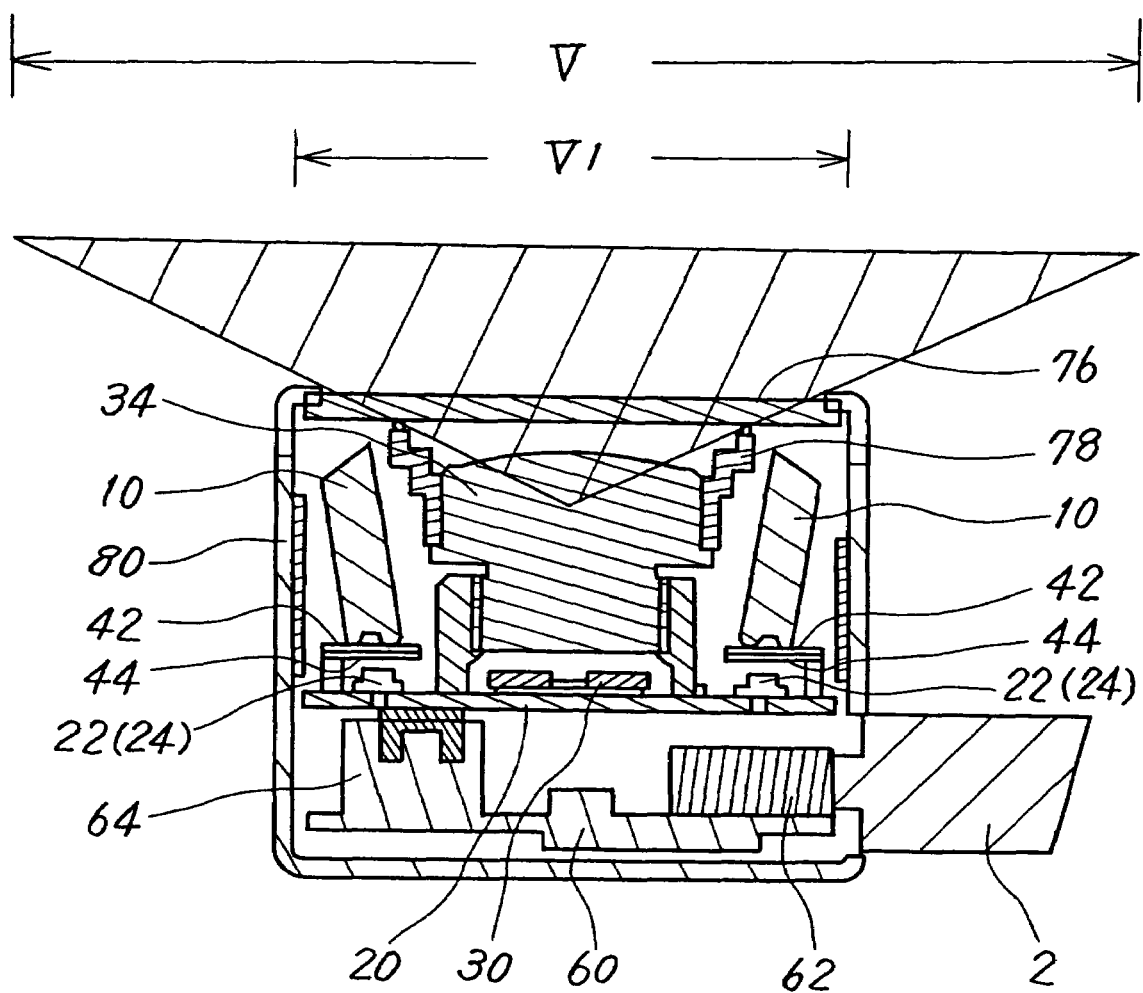
FIG. 1 shows a cross-sectional view of an image capturing apparatus according to one embodiment of the present invention.
Figure 2:
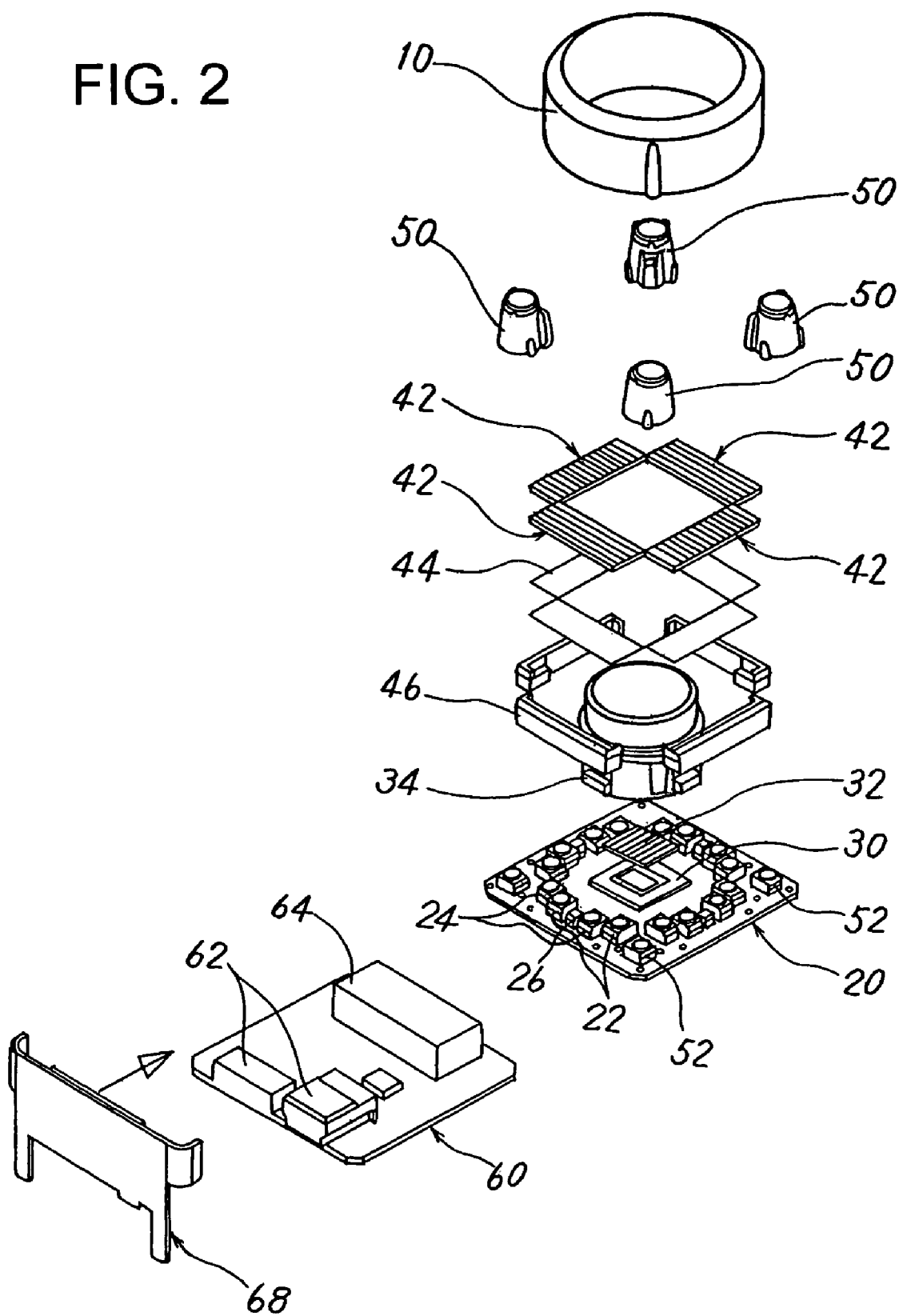
FIG. 2 shows an exploded structural view of the image capturing apparatus shown in FIG. 1.
Figure 3:
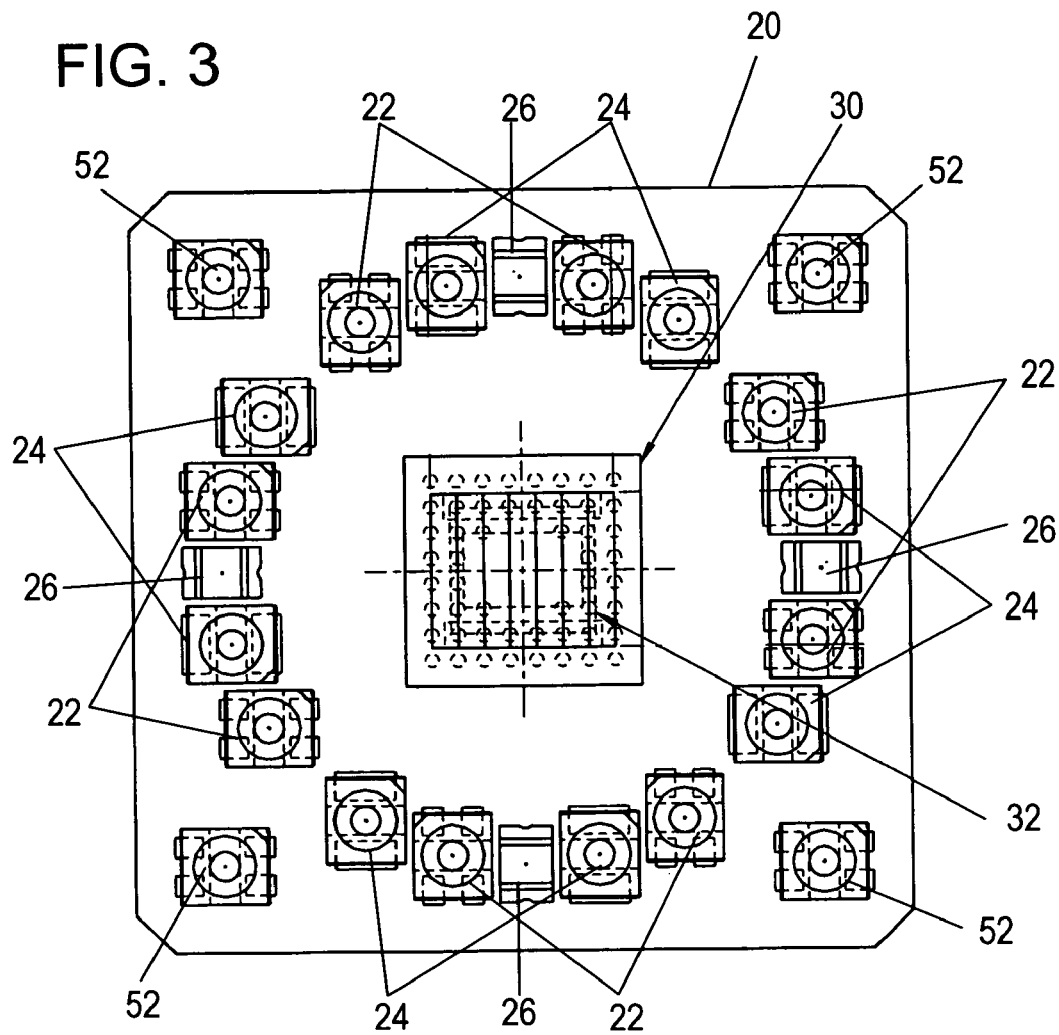
FIG. 3 shows a component layout diagram of the circuit board shown in FIG. 2.
Figure 4:
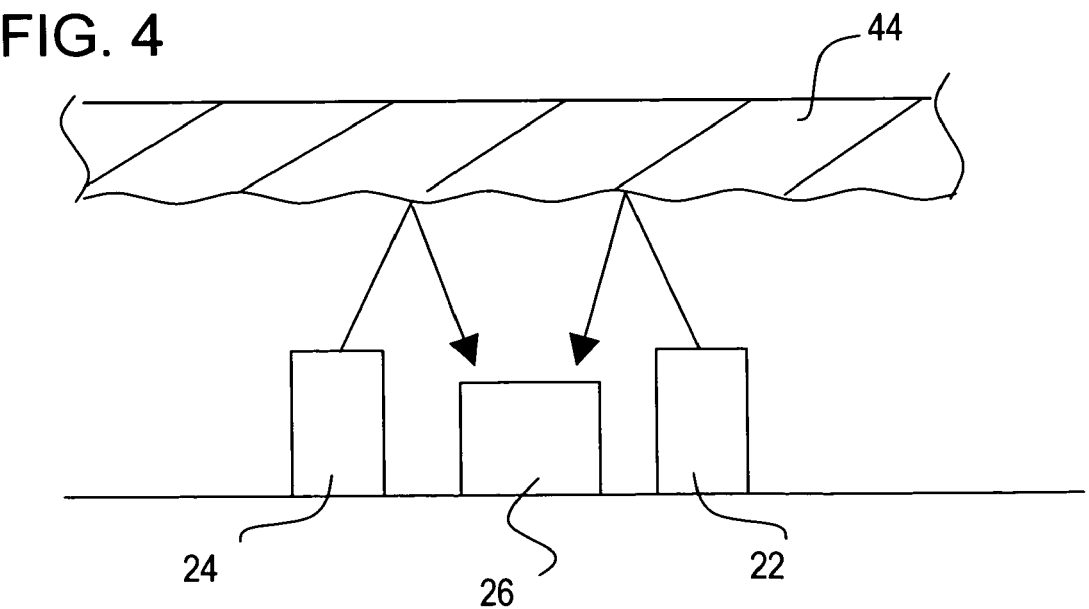
FIG. 4 shows an explanation diagram of the relationship between the light-emitting device and the photodetector device shown in FIG. 2.
Figure 7:
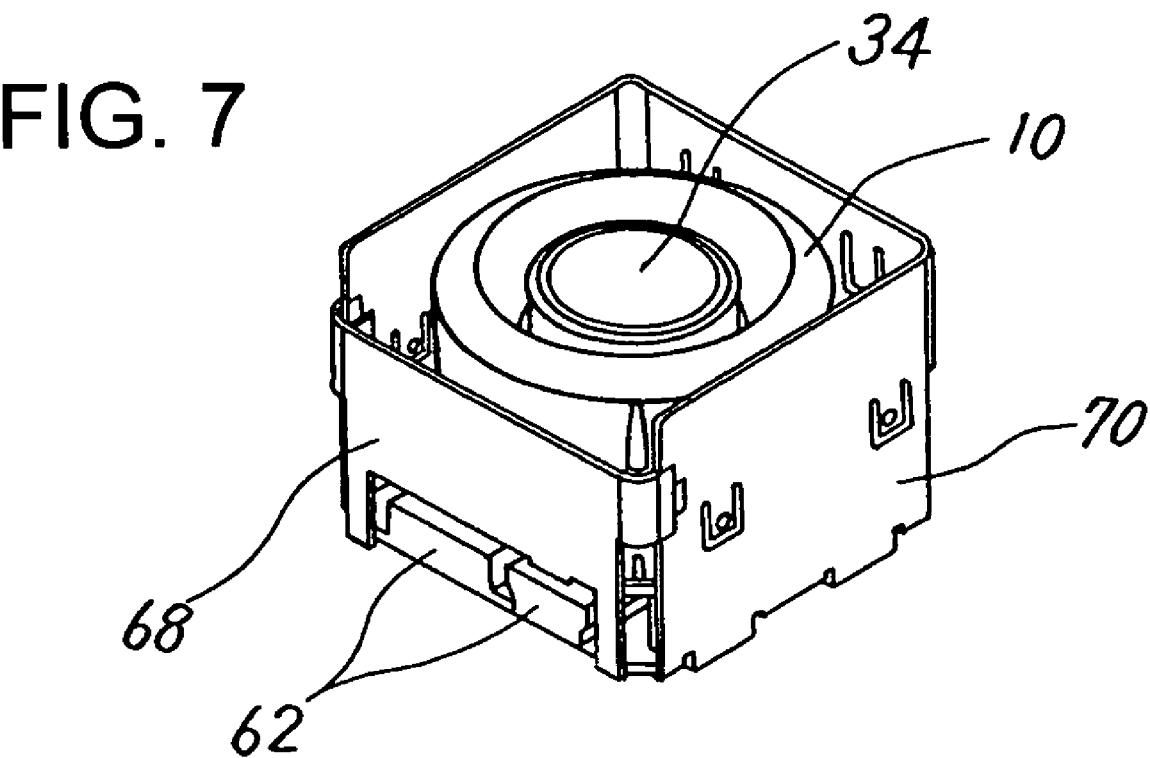
FIG. 7 shows a configuration diagram of the assembly of the assembled body shown in FIG. 2.
Figure 8:
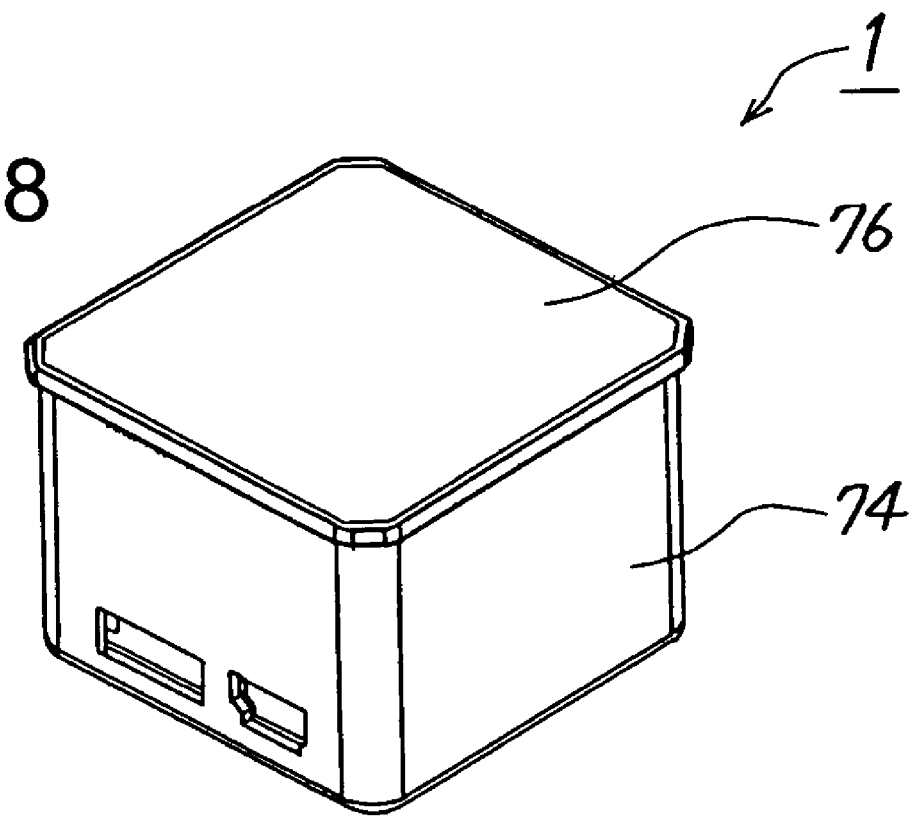
FIG. 8 shows an outer view of the image capturing apparatus shown in FIG. 1.

FIG. 1 shows a cross-sectional view of an image capturing apparatus according to one embodiment of the present invention; FIG. 2 shows an exploded structural view of the image capturing apparatus shown in FIG. 1; FIG. 3 shows a top plan view of the circuit board shown in FIGS. 1, 2; FIG. 4 shows an operation explanation diagram of a light-emitting device and a photodetector device shown in FIG. 3; FIG. 5 shows an assembly diagram when the structures shown in FIG. 2 are assembled; FIG. 6 shows a configuration diagram of the external case shown in FIG. 1; FIG. 7 shows a configuration diagram when the assembled body shown in FIG. 2 is housed in the external case; and FIG. 8 shows an outer view of the image capturing apparatus shown in FIG. 1.

Prior to the description of the configuration shown in FIG. 1, referring to FIGS. 2 through 7, the configuration of each portion illustrated in FIG. 1 is described. As shown in FIG. 2, an image sensor 30 such as a CMOS image sensor and a polarizing plate 32 are disposed at the center of a camera substrate 20. In the periphery of the image sensor 30 of the camera substrate 20, a plurality of light-emitting devices 22, 24 and photodetector devices 26 are mounted.

Describing in more detail with reference to FIG. 3, the image sensor 30 is mounted at the center of the camera substrate 20, and the polarizing plate 32 is pasted upon the image sensor 30. Along the circle in the periphery of the image sensor 30 of the camera substrate 20, a plurality of light-emitting devices 22, 24 and the photo-detector devices 26 are mounted.

Between each the above first light-emitting device 22 and each the second light-emitting device 24, the photo-detector device (photodiode) 26 is disposed. As shown in FIG. 4, the above photodetector device 26 is provided for receiving the light from both the first light-emitting device 22 and the light from the second light-emitting device 24 (reflected light from a diffusion plate 44 described later), thereby performing APC (automatic power control) of the first light-emitting device 22 and the second light-emitting device 24.

In the above example, in order to independently perform automatic power control of each the first and second light-emitting device 22, 24, which emits light at individual timing, one photodetector device 26 is disposed between the first light-emitting device 22 and the second light-emitting device 24 so as to receive the light from the first and second light-emitting devices 22, 24. Thus, the number of photodetector devices for APC control can be reduced.

Further, at the four corners of the camera substrate 20, four distance-measuring light-emitting devices 52 are provided for measuring the distance to the object. As shown in FIG. 3, the above four distance-measuring light-emitting devices 52 are disposed on the diagonal lines of the camera substrate 20, at the farthest positions on the diagonal lines so that each distance therebetween becomes farthest. From the distances measured by the above four distance-measuring light-emitting devices 52, the inclination of the object (here, palm) is detected.

In brief, on a single camera substrate 20, there are provided the illumination systems 22, 24, 26 and the imaging systems 30, 32 for capturing an image of the object, as well as the distance-measuring system 52.

Now, referring back to FIG. 2, in the upper direction of the light-emitting devices 22, 24 of the camera substrate 20, there are provided four diffusion plates 44 and four polarizing plates 42. The above diffusion plates 44 and polarizing plates 42 are pasted onto polarization/diffusion plate holders 46 being attached on the four sides of the camera substrate 20. Each diffusion plate 44 diffuses, to a certain extent, the emission distribution of the directive light emitted from the first and second light-emitting devices 22, 24. Each polarizing plate 42 converts natural light emitted from the first and second light-emitting devices 22, 24 to linearly polarized light.

In the upper direction of the four polarizing plates 42, a ring-shaped light guide member 10 is provided. The light guide member 10 is formed of, for example, resin, and guides the light from the first and second light-emitting devices 22, 24 of the camera substrate 20 in the upward direction, so as to irradiate the object with uniform light. To fit the dispositions of the light-emitting devices 22, 24 of the camera substrate 20, the light guide member 10 has a ring-shaped structure. As will be described in FIG. 9 and after, the light guide member 10 guides the light emitted from the first and second light-emitting devices 22, 24 to the upward direction, and irradiates the object with uniform light.

Further, an optical unit 34 is attached to the camera substrate 20 on the image sensor 30 disposed in the approximate center of the camera substrate 20, and inside the ring-shaped light guide member 10. The optical unit 34 is constituted of a lens optical system such as a converging lens.

An aperture 50 is mounted on the distance-measuring light-emitting device 52 of the camera substrate 20. The aperture 50 shuts off diffusion of light to other directions so as to guide the light emitted from the distance-measuring light-emitting devices 52 to the object direction.

Separately from the camera substrate 20, a control substrate 60 is provided. The control substrate 60 is provided for connecting with the outside, and includes an external connector 62 and a camera connector 64 for connecting with the camera substrate 20. The above control substrate 60 is disposed on the lower portion of the camera substrate 20, and electrically connected with the camera substrate 20 using the camera connector 64. Further, a holder cover 68 is provided for external connector 64.

In such a way, the image sensor 30, the light-emitting devices 22, 24, the photo-detector devices 26 and the distance-measuring light-emitting devices 52 are mounted on the camera substrate 20. Also, the polarization/diffusion plate holders 46, the diffusion plates 44, the polarizing plates 42, the apertures 50, the optical unit 34, and the light guide members 10 are mounted on the above camera substrate 20, and thus a camera portion is assembled. To the above camera portion, the control substrate 60 is attached. FIG. 5 shows a state of the unit after attaching the camera portion and the control substrate 60.

Further, as shown in FIG. 6, there are prepared a visible-light cutoff filter plate 76, a hood 78, a holder assembly 70 and an external case 74. By attaching attachment unit shown in FIG. 5 to the holder assembly 70 shown in FIG. 6, and also, by attaching the holder cover 68 shown in FIG. 2 to the holder assembly 70, the configuration shown in FIG. 7 is assembled.

The configuration shown in FIG. 7 is then housed into the external case 74 shown in FIG. 6, and by attaching the visible-light cutoff filter plate 76 having an attached hood 78 on the upper portion of the external case 74, an image capturing apparatus shown in FIG. 8 is structured. The above visible-light cutoff filter plate 76 cuts off the visible light component so as not to enter the image sensor 30 from outside. Further, as also described in FIG. 1, the hood 78 shuts off the light so that the light outside the predetermined image capturing area does not enter the optical unit 34, and prevents the light being leaked from the light guide member 10 from invading into the optical unit 34.

FIG. 1 shows a cross-sectional view of the finished body 1 shown in FIG. 8. As described earlier, the image sensor 30, the light-emitting devices 22, 24, the photo-detector devices 26 and the distance-measuring light-emitting device 52 are mounted on the camera substrate 20. Namely, a basic structure including the illumination system and the imaging system is mounted on the single substrate. Accordingly, only one mounting board is sufficient, thus contributing to cost reduction.

Also, with the provision of ring-shaped light guide member 10 on the upper portion of the light-emitting devices 22, 24, the light from the light-emitting devices 22, 24 is guided to the visible-light filter 76. The above light guide member 10 separates the light from the light-emitting devices 22, 24 and then forwards the light to the visible-light filter 76. Therefore, the light-emitting devices 22, 24 can be disposed close to the image sensor 30, and also on the identical substrate 20, which enables miniaturization, and illumination of the object by uniform light as well. More specifically, assuming that an oblique line portion of an upside-down triangle shape shown in FIG. 1 is the image capturing range of the camera, the image capturing range can be illuminated by uniform light.

Further, because the light guide member 10 has a ring shape, it is possible to house the optical unit 34 inside ring 10, thus enabling further miniaturization. In addition, the hood 78 prevents the light outside the predetermined image capturing range (oblique line portion in FIG. 1) from entering the optical unit 34, and also prevents the light leaked from the light guide member 10 from invading into the optical unit 34. Accordingly, even when the light guide member 10 and the light-emitting devices 22, 24 are disposed close to the image sensor 30 and optical unit 34, degradation in imaging accuracy can be avoided.

Moreover, since the distance-measuring light-emitting devices 52 are provided on the camera substrate 20, it becomes possible to further miniaturize the camera unit measuring the distance. Additionally, in FIG. 1, the control substrate 60 is connected to the lower portion of the camera substrate 20, and an external cable 2 is connected to the external connector 62 of the control substrate 60.

Illumination Mechanism

Figure 9:
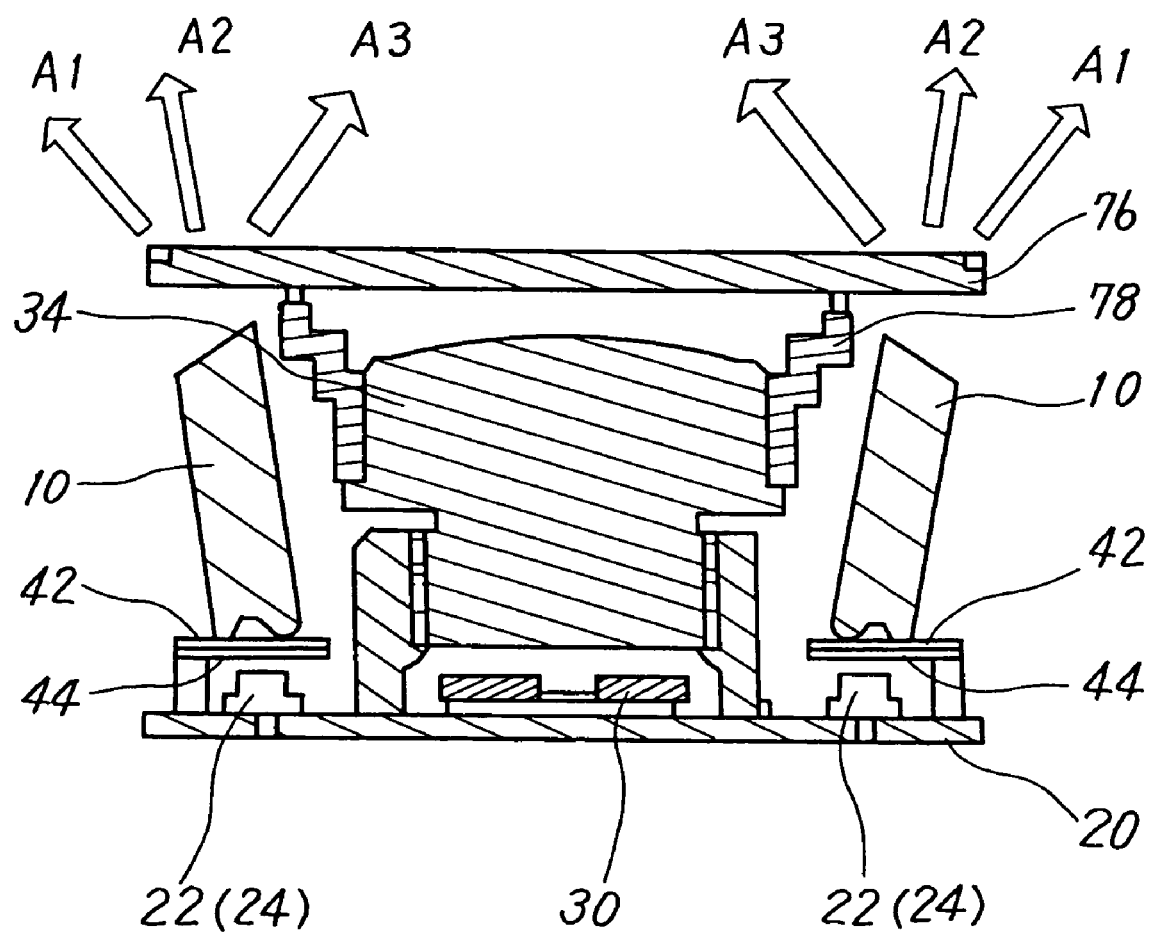
FIG. 9 shows an explanation diagram of the illumination system shown in FIG. 1.
Figure 10:
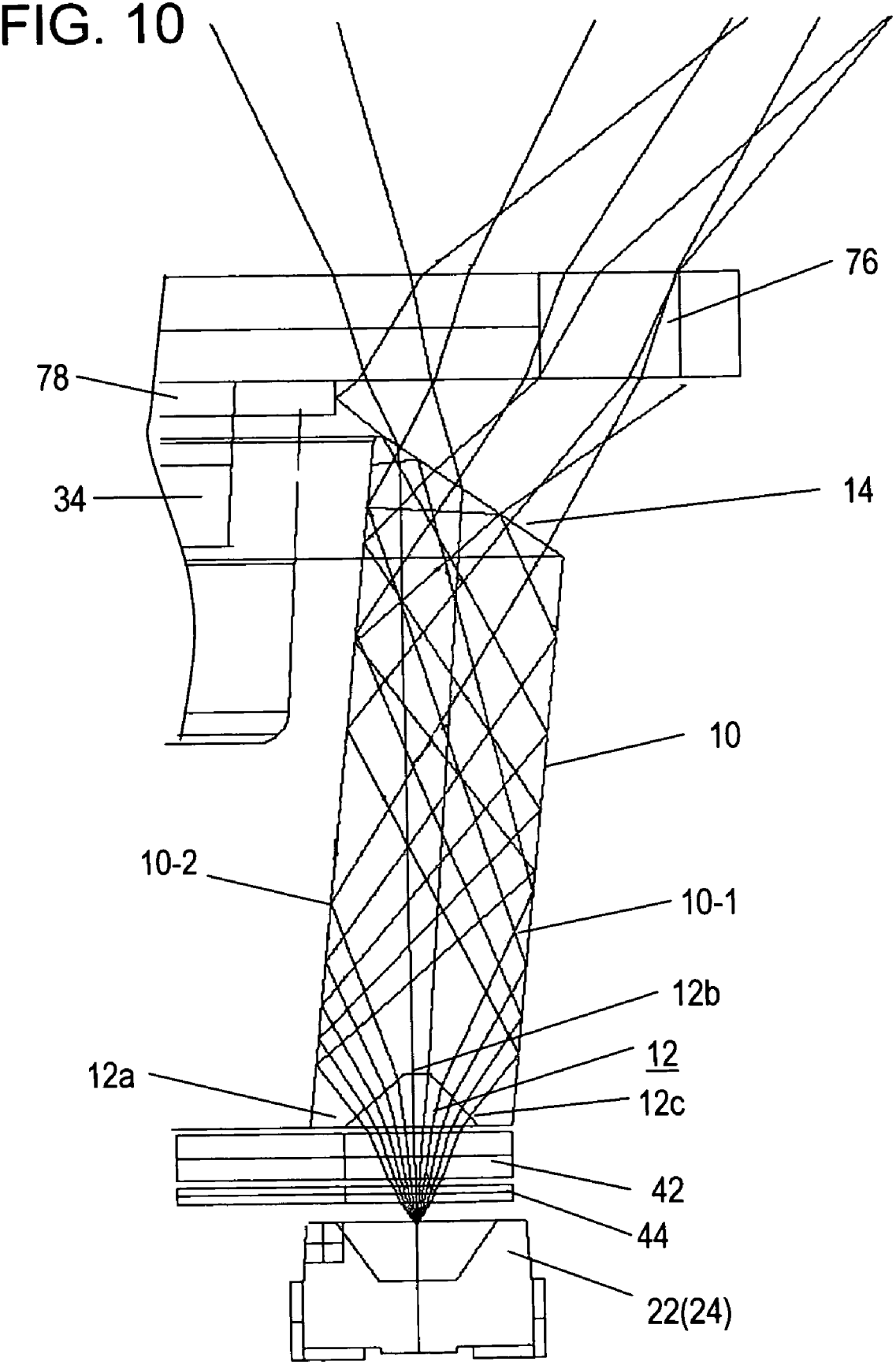
FIG. 10 shows a configuration diagram of the light guide member and the light-emitting device shown in FIG. 9.
Figure 11:
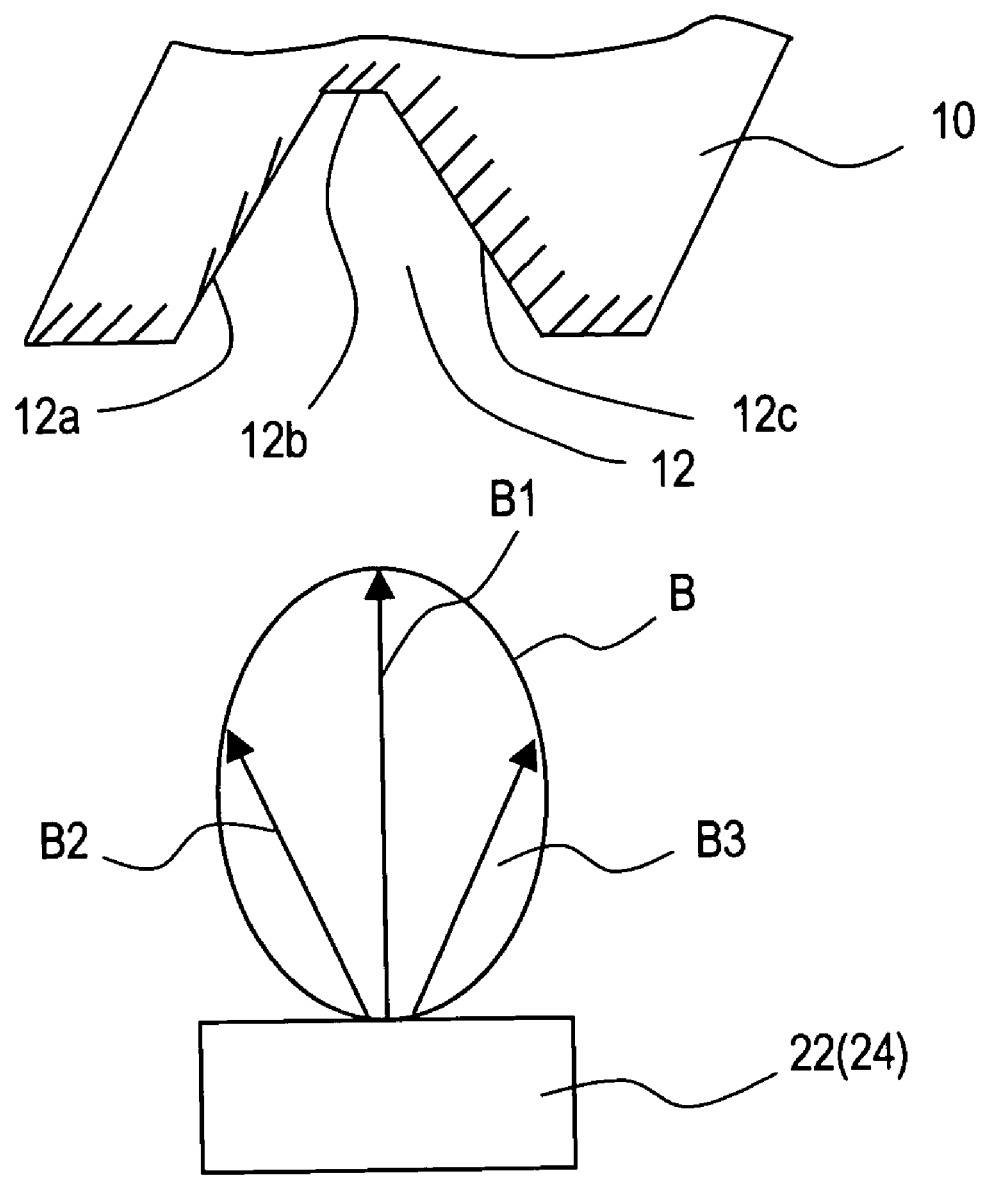
FIG. 11 shows a relation diagram of the emission intensity distribution of the light-emitting device, and the lower end portion of the light guide member shown in FIG. 10.
Figure 12:
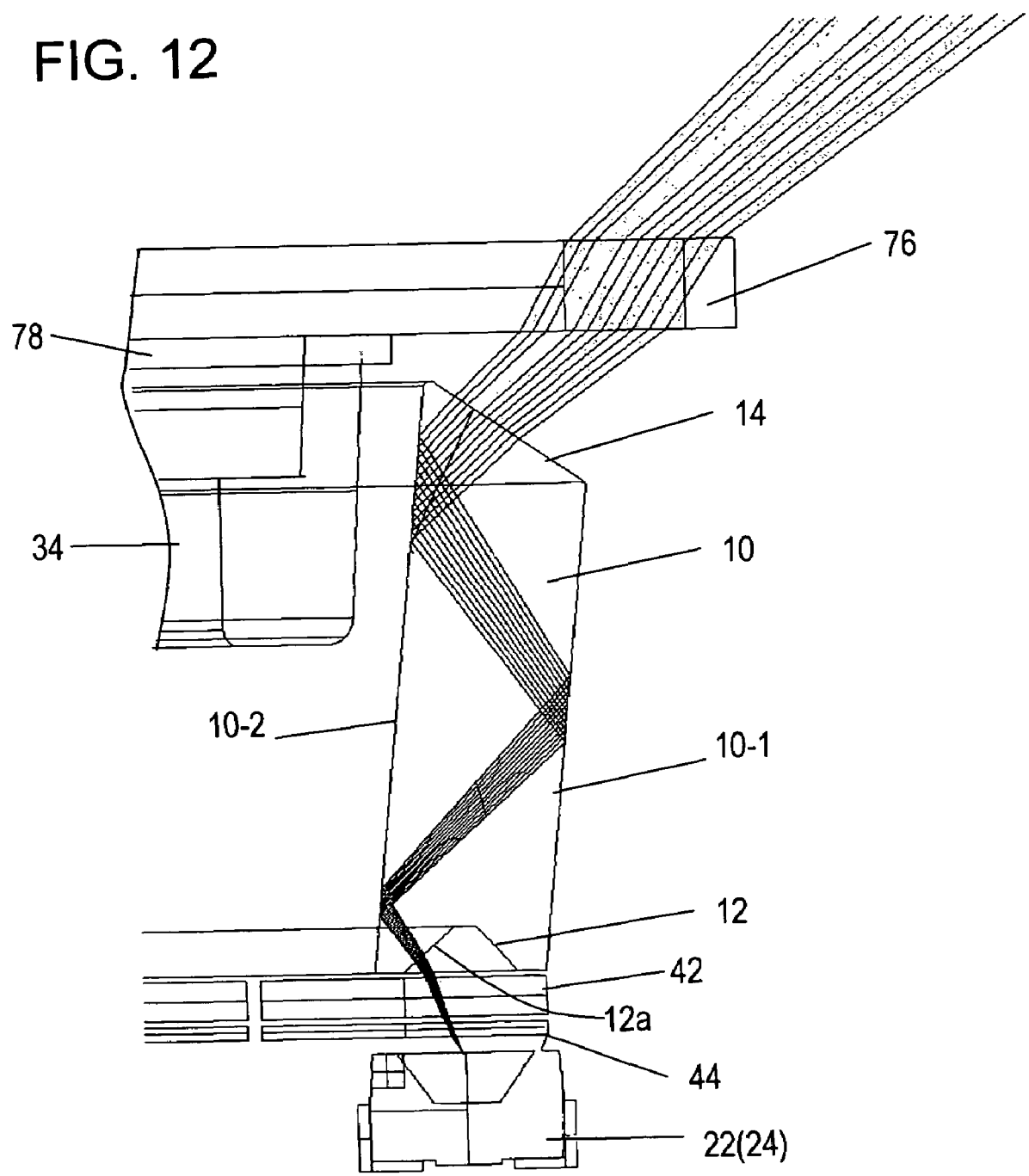
FIG. 12 shows a first operation explanation diagram of the light guide member shown in FIG. 10.
Figure 13:
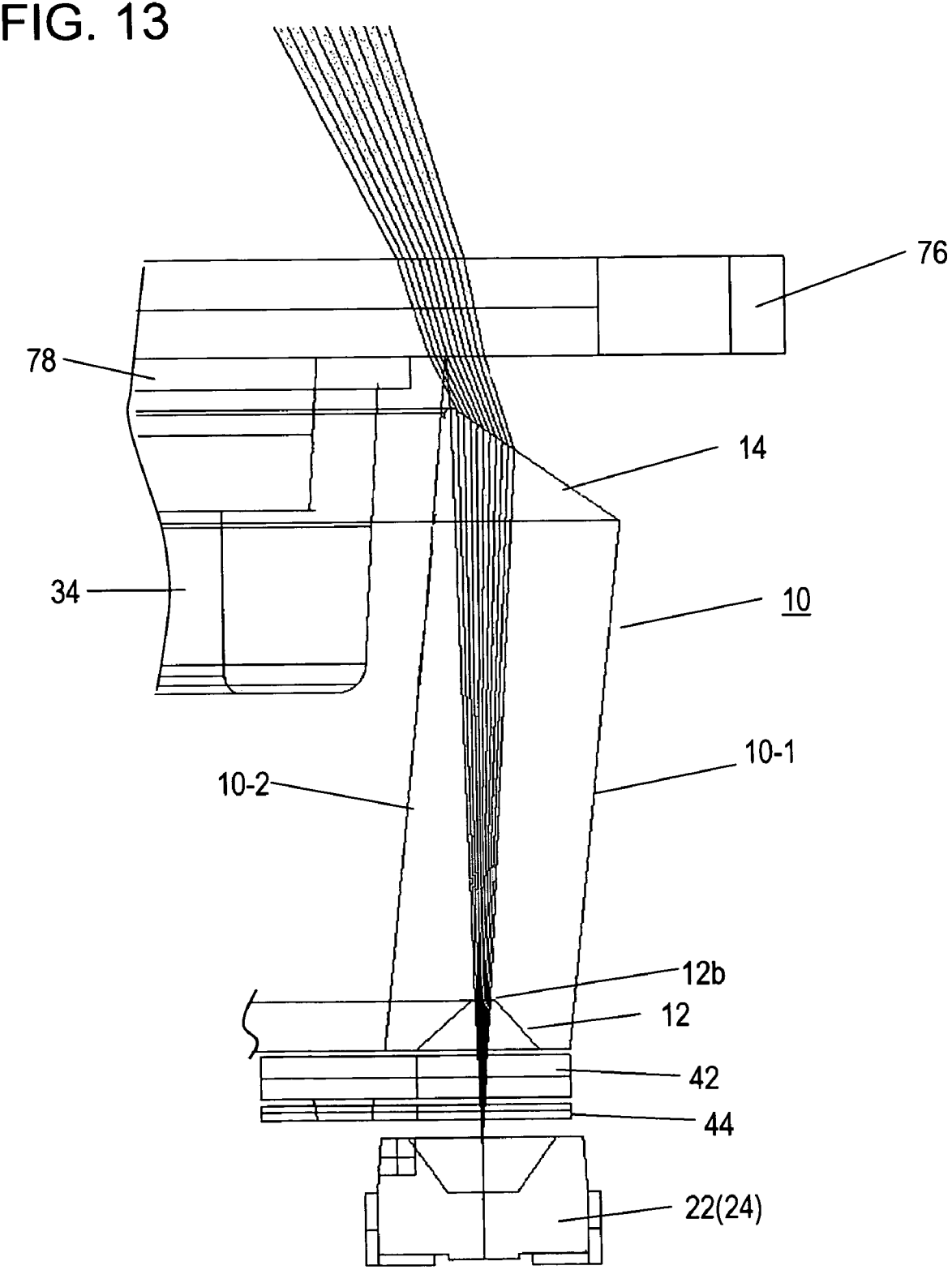
FIG. 13 shows a second operation explanation diagram of the light guide member shown in FIG. 10.
Figure 14:
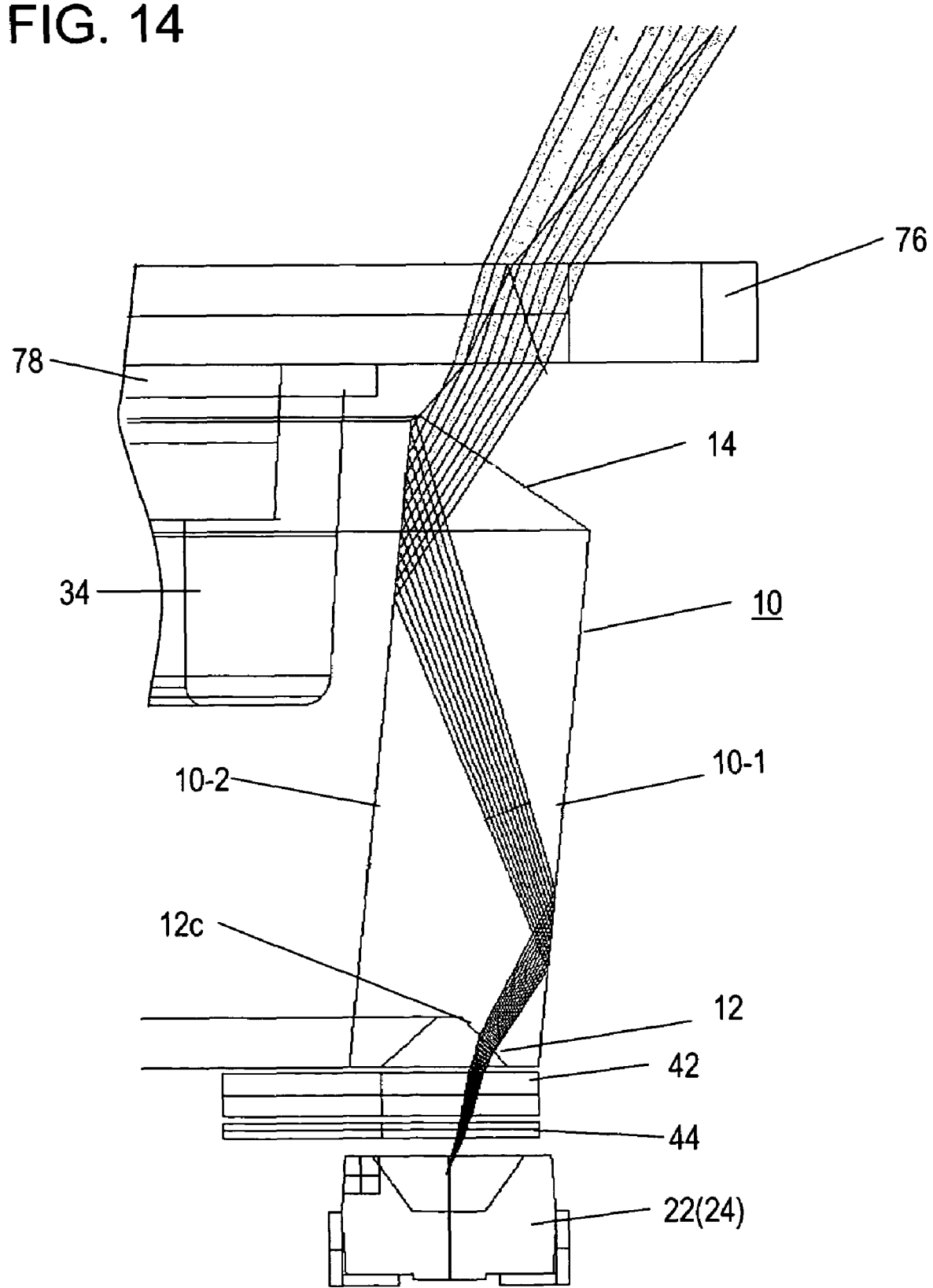
FIG. 14 shows a third operation explanation diagram of the light guide member shown in FIG. 10.
Figure 15:
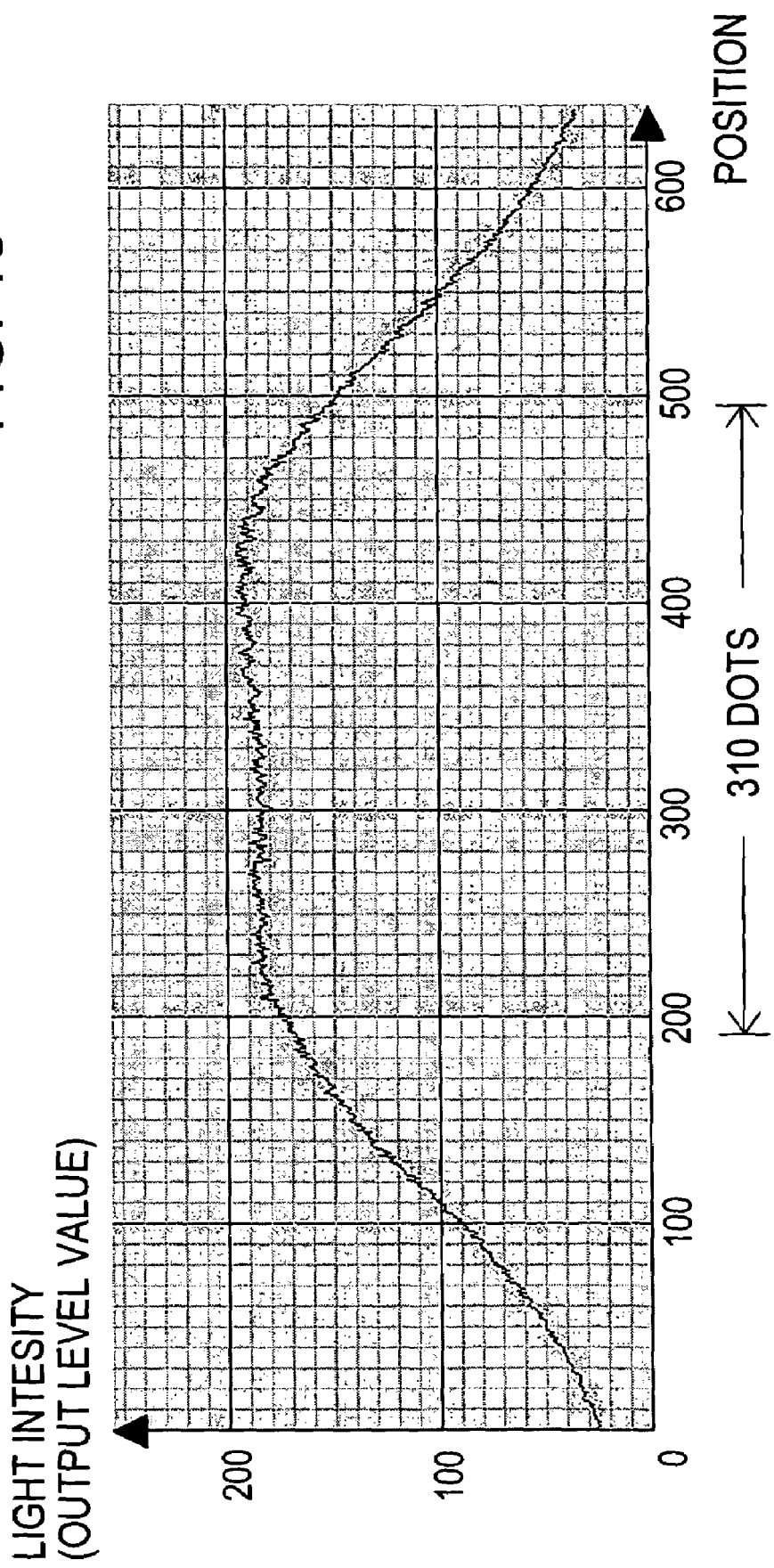
FIG. 15 shows a light intensity distribution diagram using the light guide member shown in FIG. 10.

Next, an illumination mechanism including a light guide member will be described. FIG. 9 shows an operation explanation diagram of the light guide member according to one embodiment of the present invention; FIG. 10 shows a detailed configuration diagram of the illumination mechanism shown in FIG. 9; FIG. 11 shows an explanation diagram of a trapezoidal notch of the light guide member shown in FIG. 10; FIGS. 12 through 14 show explanation diagrams of light guiding and diffusion operations of the light guide member shown in FIG. 10; and FIG. 15 shows a luminance distribution diagram by the illumination.

In FIG. 9, like parts as shown in FIGS. 1 and 2 are designated by like reference numerals. As shown in FIG. 9, the light guide member 10 guides the light from each light-emitting device 22 and 24, which is a point light source, to the visible-light filter 76 so as to split the light into three.

More specifically, from the light guide member 10, basically, light A3 to the direction of the optical unit 34, light A2 to the longitudinal direction of the light guide member 10, and light A1 to the opposite direction to the optical unit 34 are output. With the provision of the above light guide member 10, each single point light source 22, 24 can behave as if three point light sources exist in the vicinity of the visible-light filter 76.

As shown in FIG. 10, the light guide member 10 includes an upper slope face 14, two side faces 10-1, 10-2, and a lower trapezoidal groove 12. The lower trapezoidal portion 12 is positioned opposite to the light-emitting device 22, 24 by the intermediary of the polarizing plate 42 and the diffusion plate 44, and receives the light from the light-emitting device 22, 24. Also, the upper slope face 14 is a slope face of which height is higher on the optical unit 34 side.

As shown in FIG. 11, an emission intensity distribution B from the light-emitting device 22, 24 has a long (strong) circular arc shape in the upward direction. Namely, the intensity of a light component B1 to the light output direction of the light-emitting device 22, 24 (vertical direction of the device) is stronger than the intensity of light components B2, B3 to the directions to both sides. As shown in FIG. 9, trapezoidal groove 12 in the light guide member 10 is formed correspondingly to the above intensity distribution B so that the light can basically be regarded as three point light sources on the output side.

More specifically, in order to function as three point light sources by the reflection inside the light guide member 10, the trapezoidal groove 12 is constituted of a flat portion 12b for introducing the light component B1 without refracting, and a pair of slope face portions 12a, 12c for refracting and introducing the light components B2, B3 on the both sides and having gradients corresponding to the directions of the light components B2, B3. The above shapes of the trapezoidal groove 12 function to virtually split the light from each point light source 22, 24 into three.

Also, as described later, the respective lengths of the above flat portion 12b and slope face portions 12a and 12c are set so that the light intensity in a predetermined area caused by the light output from the light guide member 10 becomes substantially uniform. Here, the length of flat portion 12b, which receives the maximum intensity of the light component B1, is set shorter than each length of slope face portions 12a, 12c, which receive light intensity of the light components B2, B3 weaker than the light intensity of the light component B1. By this, depending on the light intensity distribution, the split light amount is adjusted.

The above operation is described referring to FIGS. 12 through 14. As shown in FIG. 12, the component B2 on the left side of the emission intensity distribution B of each light-emitting device 22, 24 is refracted at the left slope face portion 12a of the light guide member 10, and incident to the left side face 10-2 of the light guide member 10. The incident light is then reflected on the left side face 10-2, and forwarded to the right side face 10-1 of the light guide member 10. Subsequently, the light forwarded to the right side face 10-1 is reflected on the right side face 10-1, and forwarded again to the left side face 10-2. The light is then reflected on the left side face 10-2 and the reflected light is incident to the upper slope face 14 substantially perpendicularly, and output to the outermost portion of the image capturing range.

Also, as shown in FIG. 13, the central component B1 of the emission intensity distribution B of the light-emitting device 22, 24 is incident to the light guide member 10 from the central flat portion 12b of the light guide member 10. The light is then incident obliquely to the upper slope face 14, and output to the innermost portion of the image capturing range.

Further, as shown in FIG. 14, the component B3 on the right side of the emission intensity distribution B of the light-emitting device 22, 24 is refracted at the right slope face portion 12c of the light guide member 10, and incident to the right side face 10-1 of the light guide member 10. The incident light is then reflected on the right side face 10-1, and forwarded to the left side face 10-2 of the light guide member 10. Subsequently, the light forwarded to the left side face 10-2 is reflected on the left side face 10-2 and is incident to the upper slope face 14 substantially perpendicularly, and output between the innermost portion and the outermost portion of the image capturing range.

By synthesizing FIGS. 12 through 14, an optical path diagram as shown in FIG. 10 is obtained. Namely, at the trapezoidal groove 12, the light guide member 10 splits the point emission of the point light source 22, 24 into three. Using the reflection on the side faces inside the light guide member 10, each split light is output in such behavior as three point light sources existent on the output side of the light guide member 10.

In this case, considering the image capturing range (shown by oblique lines) shown in FIG. 1, the output direction is adjusted at the upper slope face 14 of the light guide member 10. Also, in order to obtain substantially uniform light intensity in the image capturing range, the lengths i.e. the incident widths of, or the incident amount to, flat portion 12b and slope face portions 12a, 12c of the trapezoidal groove 12 of the light guide member 10 are adjusted, taking into consideration the emission intensity distribution B of the light-emitting device 22, 24 described earlier in FIG. 11.

Here, to obtain the substantially uniform light intensity, because the emission intensity distribution B of the light-emitting device 22, 24 described in FIG. 11 has stronger light intensity at the center, while weaker light intensity in the periphery, the length of the flat portion 12b of the trapezoidal groove 12 is set shorter than each length of slope face portions 12a, 12c. Thus, it is structured that the light portion having strong light intensity is incident not only to the flat portion 12b, but also to the slope face portions 12a, 12c.

Also, using the groove 12 having a trapezoidal shape and the upper slope face 14 of the light guide member 10, and the reflection by the light guide member 10, the reflected light and the rectilinear light can be output with diffusion so as to obtain substantially uniform light intensity throughout the image capturing range.

FIG. 15 shows a diagram illustrating an experiment result in regard to the image capturing range and the light intensity of the image capturing apparatus shown in FIG. 1. In FIG. 15, the horizontal axis indicates the position, while the vertical axis indicates the light intensity. More specifically, the position is a dot position of image sensor 30, and here, the image sensor 30 having 640 dots in width is employed. By placing plain white paper for experimental purpose on the flat portion of the upper part of the image capturing range (oblique line portion) shown in FIG. 1, thereby producing uniform reflection, an output level value of each dot of the image sensor 30 has been measured. Because of the white paper, the output level value corresponds to the light intensity.

According to the above example of the experiment result, substantially uniform light intensity has been obtained in the width of approximately 310 dots in the center of image sensor 30. For example, the maximum level in the 310 dot width is '190', the minimum level is '160', which range within ±15% of the medium value '175', with the error of 10% or less.

Referring to FIG. 1, for an image capturing range V of the image sensor 30, the range of uniform light intensity is shown by V1. Although the image capturing range is V, by extracting particularly important features of an imaging object from an image in the range of the above V1, highly accurate feature extraction becomes obtainable.

In addition, an image obtained outside the range of V1 may also be used for feature extraction of a lower degree of importance, by matching the level through level correction.

Image Processing Configuration

Figure 16:
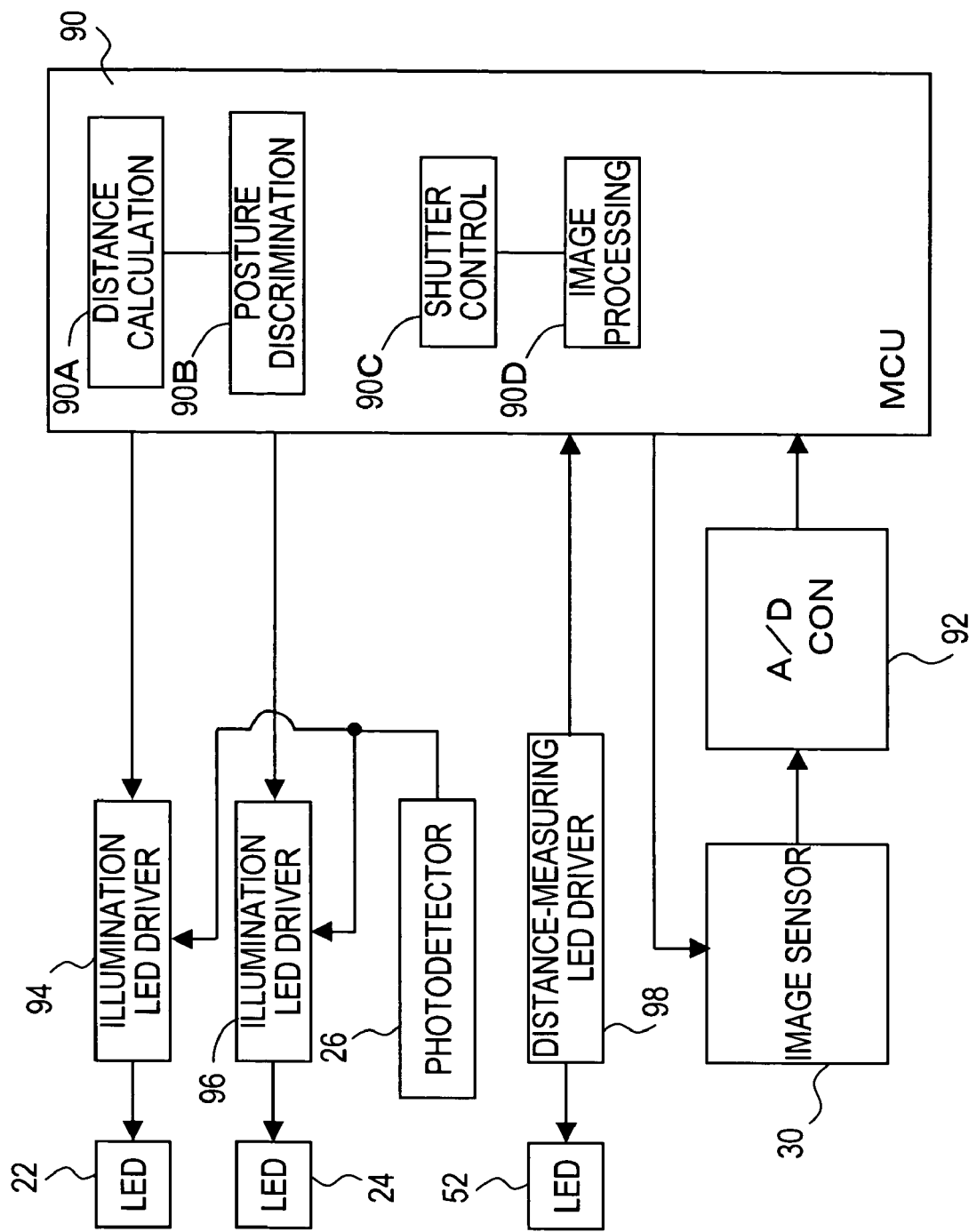
FIG. 16 shows a block diagram of a control circuit for the image capturing apparatus shown in FIG. 1.
Figure 17:
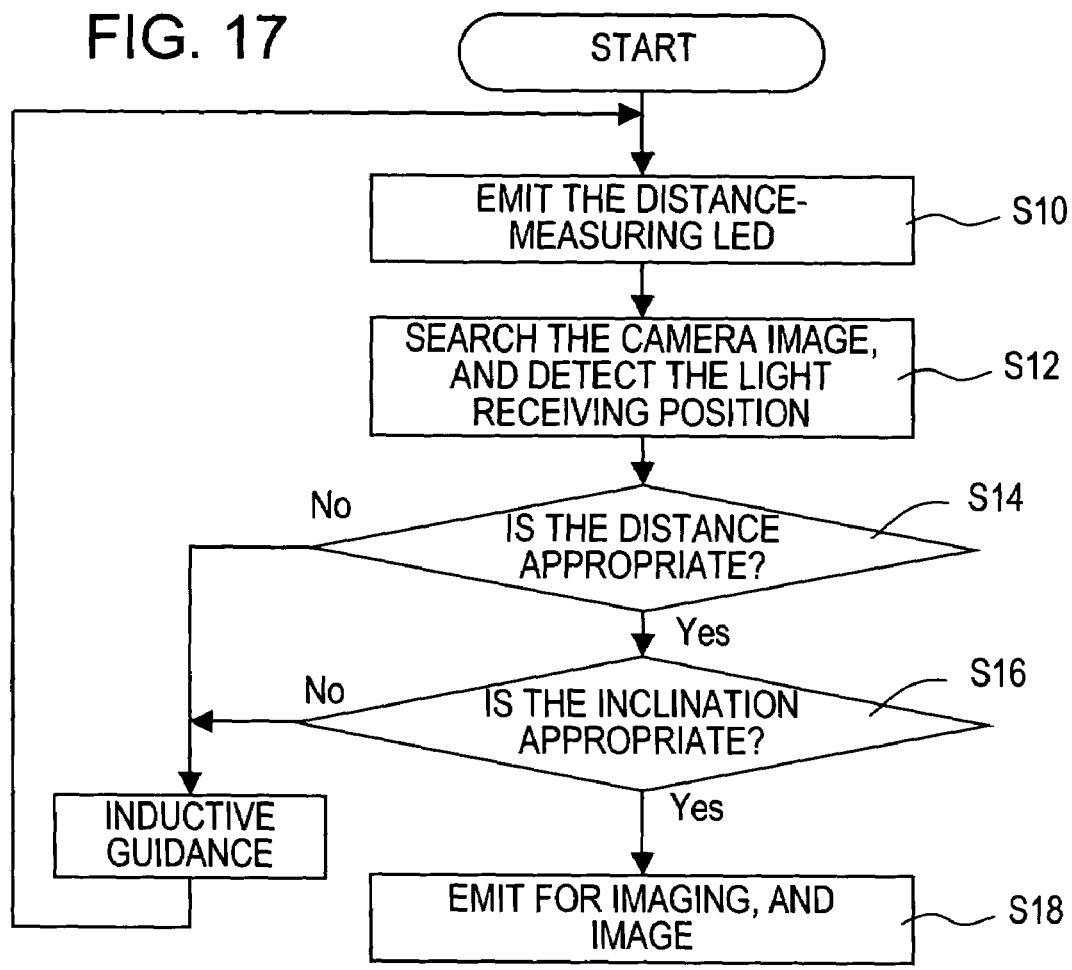
FIG. 17 shows an imaging process flowchart of the control circuit shown in FIG. 16.
Figure 18:
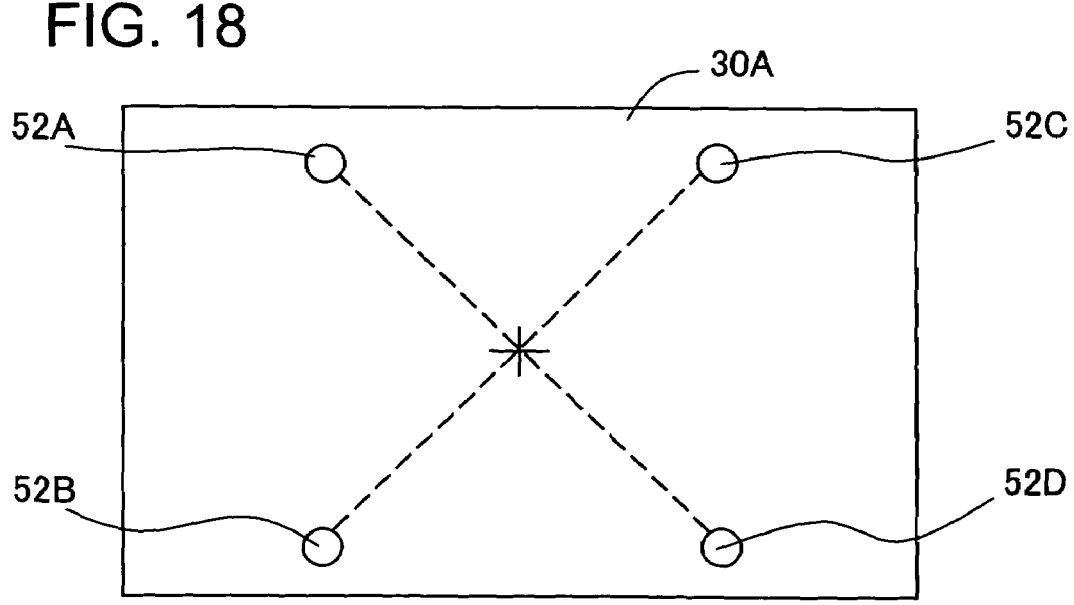
FIG. 18 shows an explanation diagram of distance measurement operation using the configuration shown in FIG. 16.
Figure 19:
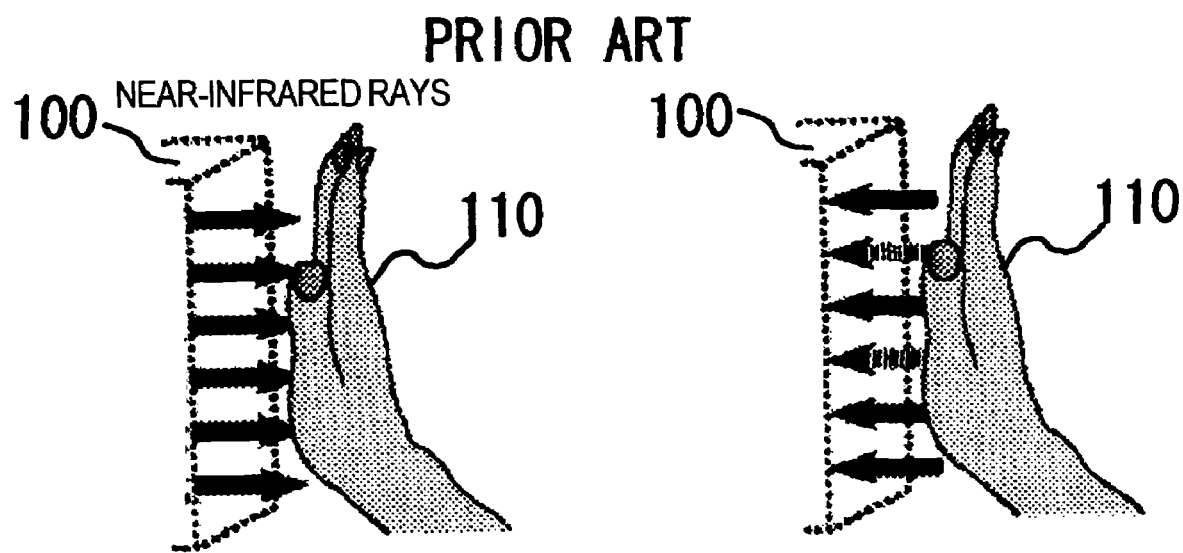
FIG. 19 shows an explanation diagram of the conventional palm image capturing apparatus.
Figure 20:
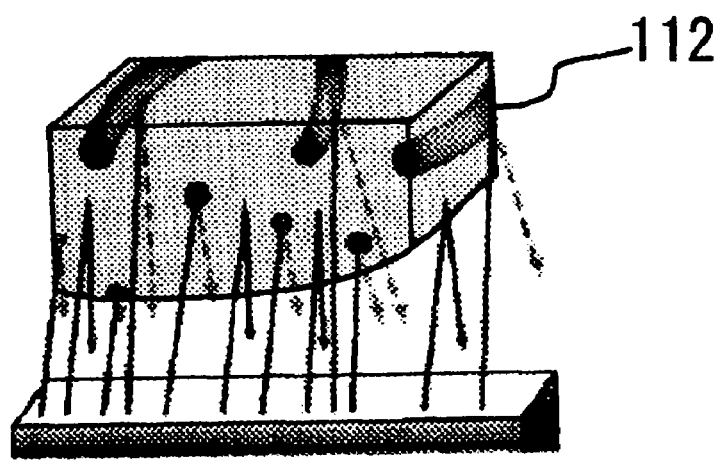
FIG. 20 shows a principle explanation diagram of the conventional palm image capturing apparatus.
Figure 23:
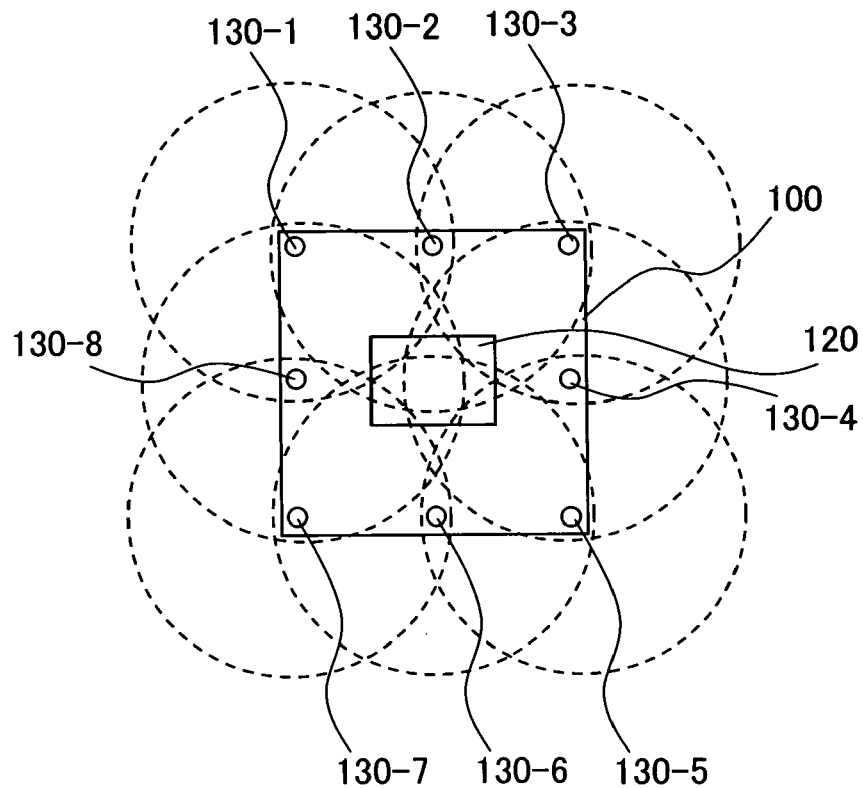
FIG. 23 shows an explanation diagram of an illumination configuration in the conventional image capturing apparatus.
Figure 24:
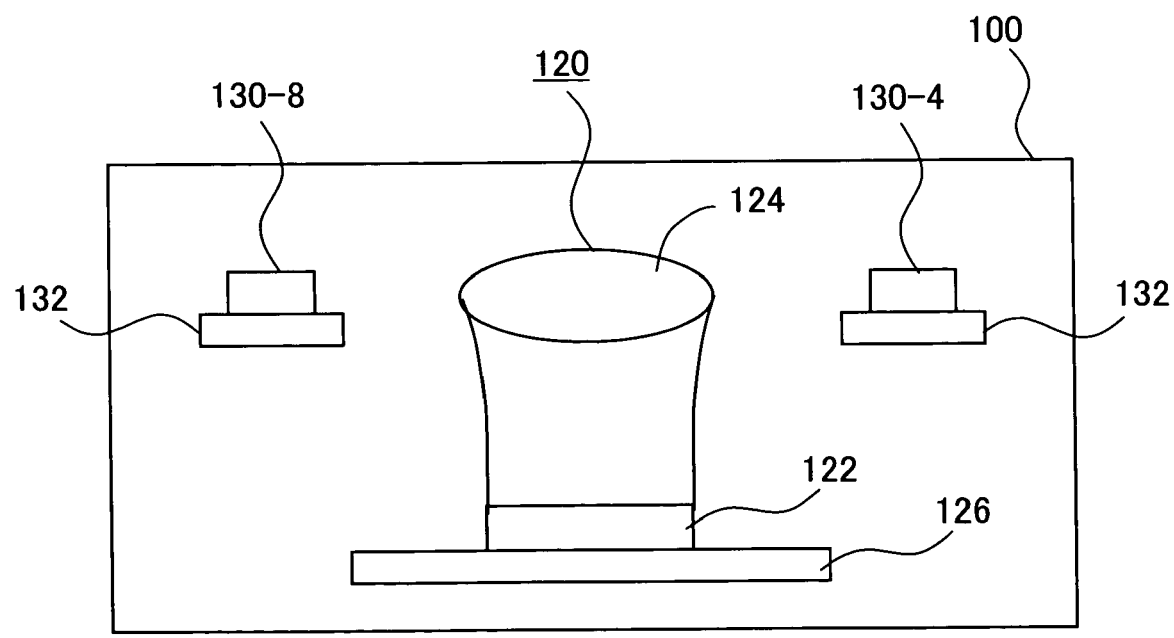
FIG. 24 shows a configuration diagram of the conventional image capturing apparatus.

FIG. 16 shows a block diagram of an captured image processing apparatus according to one embodiment of the present invention. FIG. 17 shows a flowchart of the captured image processing in the above image processing apparatus. Also, FIG. 18 shows an explanation diagram of distance measurement operation.

As shown in FIG. 16, a drive/process system in the image capturing apparatus includes a first illumination LED driver 94 for driving the first light-emitting device 22, a second illumination LED driver 96 for driving the second light-emitting device 24, a distance-measuring LED driver 98 for driving the distance-measuring light-emitting devices 52, an analog/digital converter 92 for converting the analog output of each pixel from the image sensor 30 to a digital value, and a microcontroller 90.

As described in FIG. 4, the first and second illumination LED drivers 94, 96 perform APC (automatic power control) in each light emission period, according to the light intensity received in the photo-detector device 26. Microcontroller (MCU) 90 includes MPU (microprocessor), ROM (read-only memory) and RAM (random access memory), and executes processing including distance measurement 90A, posture discrimination 90B, shutter control 90C and image processing 90D.

Referring to FIG. 17, imaging processing in MCU 90 is described below.

(S10) MCU 90 drives the distance-measuring light-emitting devices (LED) 52 via the distance-measuring LED driver 98. By this, four distance-measuring light-emitting devices 52 described in FIGS. 2 and 3 emit light. As shown in FIG. 1, the image sensor 30 photographs an image in the image capturing range. Here, since the illumination light-emitting devices 22, 24 are not driven, the image sensor 30 receives only the reflected light from the object in the image capturing range corresponding to the light emitted from the distance-measuring light-emitting devices 52. In FIG. 18, there are shown the positions of the reflected light 52A, 52B, 52C and 52D in an image 30A of the image sensor 30, being received from the object in the image capturing range corresponding to the light emitted from each distance-measuring light-emitting device 52. The above positions deviate depending on the inclination of the object (for example, palm).

(S12) Next, by means of analog/digital (A/D) converter 92, each analog light reception amount in image 30A of the image sensor 30 is converted into a digital value, and then stored into the memory of MCU 90. MCU 90 searches the image data in the memory, and detects the positions of the above reflected light 52A, 52B, 52C and 52D.

At this time, since the four distance-measuring light-emitting devices 52 are disposed diagonally from the center of the image (imaging range) as shown in FIGS. 3 and 18, by searching on the straight lines, as shown by the dotted lines in FIG. 18, the positions of the four points can be detected from the pixel luminance on the straight lines. Further, because the light-emitting devices 52 are disposed in the farthest positions on the diagonal lines with sufficient distances, it is possible to detect the positions farthest from the center in the image. From the above four positions, MCU 90 detects the distance and the inclination of the object using the triangulation measuring method. Namely, by use of the positions from the center of the image sensor 30, a distance at each of the four points is calculated, and the inclination (in four directions) can be detected from the distance difference of the four points.

(S14) MCU 90 decides whether the distance to the imaging object is appropriate (whether the object is positioned in the image capturing range with a predetermined focal distance). When the distance to the imaging object is not appropriate, MCU 90 displays a guidance message on a non-illustrated display portion. For example, a guidance message of "Put the object (palm) closer." or "Put the object (palm) further." is displayed.

(S16) When the distance is appropriate, MCU 90 decides whether the inclination of the imaging object is appropriate. For example, when imaging a flat portion (palm, etc.) of the object, it is decided whether the inclination is within a tolerable range. When the inclination of the imaging object is not appropriate, MCU 90 displays a guidance message on the non-illustrated display portion. For example, in case that a palm is the object, a guidance message of "Open your hand." or the like is displayed.

(S18) When the inclination is appropriate, MCU 90 instructs illumination LED drivers 94, 96 to emit light. Thus, light-emitting devices 22, 24 emit light, so as to irradiate the object. Subsequently, MCU 90 drives a non-illustrated electric shutter (provided in the optical unit), and photographs the image in the image capturing range by the imaging sensor 30. MCU 90 then stores the image into the memory via A/D converter 92. Then, the feature is extracted from the above image.

As such, the image sensor 30 is also used for the distance-measuring photodetector portion to detect whether the imaging object lies at the focal distance, or the inclination thereof. Thus, in the distance measurement mechanism, it is sufficient to provide the distance-measuring light-emitting devices 52 without particularly providing photodetector devices for distance measurement. This contributes a reduction of cost, and miniaturization as well, due to a reduced number of mounting components.

Also, because four distance-measuring light-emitting devices 52 are disposed diagonally from the center of the image (imaging range), the positions of the four points can be detected by searching the image data stored in the memory as shown by the dotted lines in FIG. 18, and thus, detection processing becomes easy. Further, because the distance-measuring light-emitting devices 52 are disposed in the furthest positions on the diagonal lines with sufficient distances, it is possible to detect the farthest positions in the image from the center even the apparatus is miniaturized, and detection of the inclination can be performed accurately.

Other Embodiments

In the aforementioned embodiment, the description is made using the lower groove 12 of a trapezoidal shape. However, other polyhedron shapes are applicable. For example, in the above description, the groove has three planes because of the trapezoidal cross section, but a groove of a polyhedron shape such as having four planes may be used depending on required performance. When attaching importance to the cost, a polyhedron having a smaller number of faces is better, and therefore, a trapezoid is better here.

Also, in the above description, the imaging object is exemplified by the palm, and the image processing of the imaging object is exemplified by the vein pattern authentication. However, the present invention is also applicable to other biometric authentication by use of other features of human bodies, including hand skin pattern, blood vessel image of the back of hand, blood vessel image of a finger, and features of face and iris, etc. Also, the present invention is not limited to the application to the biometric authentication, but applicable to other applications.

The number of distance-measuring light-emitting devices is not limited to four, but any plurality may be chosen.

The foregoing description of the embodiments is not intended to limit the invention to the particular details of the examples illustrated. Any suitable modification and equivalents may be resorted to the scope of the invention.

All features and advantages of the invention which fall within the scope of the invention are covered by the appended claims.

What is claimed is:

1. An illumination apparatus comprising:
   a cylinder-shaped light guide member; and
   a plurality of point light sources disposed at intervals on a lower end portion of the cylinder-shaped light guide member along the light guide member,
   wherein said light guide member comprising:
   the lower end portion for introducing the light of the point light sources;
   an upper end portion for outputting the light; and
   a light guide portion having a pair of side faces and for guiding the light of the point light sources from the lower end portion to the upper end portion,
   and wherein the lower end portion includes a groove portion for receiving the output light of each of the point light sources and diffusing the output light of the point light sources to at least three directions from an incident side toward an output side,
   and wherein the groove portion of the light guide member provided along a circumference direction of said cylinder-shaped light guide member corresponding to positions of said plurality of point light sources and comprises:
   a flat portion; and
   a pair of slope faces each having an opposite inclination direction and for refracting the output light of the point light sources to one side face direction and to the other side face direction of the light guide portion.

2. The illumination apparatus according to claim 1, wherein the groove portion of the light guide member includes a polyhedron having at least the pair of slope faces where one of the slope faces of the polyhedron refracts the output light of the point light sources to the side face direction.

3. The illumination apparatus according to claim 1, wherein the flat portion area of the groove portion of the light guide member is smaller than each area of the pair of slope faces.

4. The illumination apparatus according to claim 1, wherein the flat portion and the pair of slope faces of the light guide member respectively have areas corresponding to emission intensity distribution of the point light source.

5. The illumination apparatus according to claim 1, wherein the groove portion of the light guide member has a trapezoidal shape.

6. The illumination apparatus according to claim 1, wherein the upper end portion of the light guide member includes a slope face which becomes lower toward the outside of the cylinder-shaped light guide member.

7. An image capturing apparatus for capturing an image of an object by illuminating the object and receiving reflected light from the object, comprising:
   a circuit board mounted an image sensor for receiving the reflected light;
   a plurality of light-emitting devices mounted on the circuit board in the peripheral positions of the image sensor;
   a ring-shaped light guide member for guiding the light emitted from the plurality of light-emitting devices to an image capturing range and illuminating the image capturing range; and
   an optical unit accommodated inside the ring of the ring-shaped light guide member and for guiding the reflected light on the illuminated object located in the image capturing range to the image sensor,
   wherein said light guide member comprises:
   a lower end portion for introducing the light of the light-emitting devices;
   an upper end portion for outputting the light; and
   a light guide portion having a pair of side faces and for guiding the light of the light-emitting devices from the lower end portion to the upper end portion,
   and wherein the lower end portion includes a groove portion for receiving the output light of each or the light-emitting devices and diffusing the output light of the light-emitting devices to at least three directions from the incident side toward an output side,
   and wherein the groove portion of the light guide member provided along a circumference direction of said light guide member corresponding to positions of said plurality of light-emitting devices comprises:
   a flat portion; and
   a pair of slope faces each having an opposite inclination direction and for refracting the output light of the light-emitting devices to one side face direction and to the other side face direction of the light guide portion.

8. The image capturing apparatus according to claim 7, wherein the plurality of light-emitting devices are mounted on the circuit board at predetermined intervals along a circle in the periphery of the image sensor,
   and wherein the light guide member has a ring shape corresponding to the circle.

9. The image capturing apparatus according to claim 7, wherein the groove portion of the light guide member includes a polyhedron having at least the pair of slope faces where one of the slope faces of the polyhedron refracts the output light of the point light source light emitting devices to the side face direction.

10. The image capturing apparatus according to claim 9, wherein the groove portion of the light guide member has a trapezoidal shape.

11. The image capturing apparatus according to claim 7 wherein the flat portion area of the groove portion of the light guide member is smaller than each area of the pair of slope faces.

12. The image capturing apparatus according to claim 7, wherein the flat portion and the pair of slope faces of the light guide member respectively have areas corresponding to emission intensity distribution of the light-emitting devices.

13. The image capturing apparatus according to claim 7, wherein the upper end portion of the light guide member includes a slope face which becomes lower toward the outside of the ring shaped light guide member.

14. The image capturing apparatus according to claim 7, wherein the image sensor captures an image of a portion of a living body.

* * * * *